(12) United States Patent
Yokota et al.

(10) Patent No.: US 10,483,061 B2
(45) Date of Patent: Nov. 19, 2019

(54) PROTECTIVE DEVICE

(71) Applicant: LITTELFUSE JAPAN G.K., Kawasaki-shi, Kanagawa (JP)

(72) Inventors: Takayuki Yokota, Narita (JP); Masaaki Iwai, Inashiki (JP); Hirotsugu Takegawa, Osaka (JP); Naotaka Ikawa, Osaka (JP)

(73) Assignee: LITTELFUSE JAPAN G.K., Tokyo (JP)

( * ) Notice: Subject to any disclaimer, the term of this patent is extended or adjusted under 35 U.S.C. 154(b) by 424 days.

(21) Appl. No.: 14/901,987

(22) PCT Filed: Jul. 1, 2014

(86) PCT No.: PCT/JP2014/067516
§ 371 (c)(1),
(2) Date: May 1, 2017

(87) PCT Pub. No.: WO2015/002187
PCT Pub. Date: Jan. 8, 2015

(65) Prior Publication Data
US 2018/0040443 A1     Feb. 8, 2018

(30) Foreign Application Priority Data
Jul. 2, 2013   (JP) ................. 2013-138958

(51) Int. Cl.
*H01H 37/60*   (2006.01)
*H01H 37/34*   (2006.01)
(Continued)

(52) U.S. Cl.
CPC ............ *H01H 37/34* (2013.01); *H01H 37/60* (2013.01); *H01H 85/46* (2013.01); *H02H 3/085* (2013.01); *H01C 7/02* (2013.01); *H01H 37/761* (2013.01); *H01H 61/02* (2013.01); *H01H 85/0241* (2013.01); *H01H 2235/01* (2013.01)

(58) Field of Classification Search
USPC ................. 361/13, 103, 106, 93.7–93.9
See application file for complete search history.

(56) References Cited

U.S. PATENT DOCUMENTS

| | | | | |
|---|---|---|---|---|
| 5,737,160 | A * | 4/1998 | Duffy | H01H 33/161 361/3 |
| 6,452,475 | B1 * | 9/2002 | Kawazu | H01H 85/463 29/623 |
| 2015/0229118 | A1 * | 8/2015 | Hasunuma | H01C 7/02 361/93.8 |

FOREIGN PATENT DOCUMENTS

| | | |
|---|---|---|
| CN | 1200844 A | 12/1998 |
| CN | 1202268 A | 12/1998 |

(Continued)

*Primary Examiner* — Danny Nguyen (57) ABSTRACT

A protection device including: (i) a protection component having a first thermal fuse and a resistive body, the resistive body being supplied with a current in an abnormal state to generate heat, the heat activating the first thermal fuse to cut off the current; (ii) a PTC component; and (iii) a second thermal fuse, the second thermal fuse being electrically connected in series to the PTC component, the first thermal fuse of the protection component being electrically connected in parallel to the PTC component and to the second thermal fuse, and the protection component being activated in the abnormal state so that the PTC component trips to generate heat, the heat blowing the second thermal fuse.

12 Claims, 5 Drawing Sheets

(51) Int. Cl.
*H01H 85/46* (2006.01)
*H02H 3/08* (2006.01)
*H01C 7/02* (2006.01)
*H01H 37/76* (2006.01)
*H01H 85/02* (2006.01)
*H01H 61/02* (2006.01)

(56) References Cited

FOREIGN PATENT DOCUMENTS

| | | |
|---|---|---|
| CN | 1457542 A | 11/2003 |
| CN | 101647168 A | 2/2010 |
| CN | 101983411 A | 3/2011 |
| CN | 102362331 A | 2/2012 |
| CN | 104170196 A | 11/2014 |
| JP | 2000067710 A | 3/2000 |
| JP | 2002233048 A | 8/2002 |
| JP | 2009295567 A | 12/2009 |
| JP | 2012521635 A | 9/2012 |
| TW | 533615 B | 5/2003 |
| TW | 201106409 A | 2/2011 |
| WO | 2008114650 A1 | 9/2008 |

* cited by examiner

PROTECTIVE DEVICE

TECHNICAL FIELD

The present invention relates to a protection device.

BACKGROUND ART

Various electric circuits have a protection device incorporated therein in order to protect electric/electronic apparatuses and/or electric/electronic parts, or electric/electronic circuits incorporated therein when a current larger than the rated current flows and/or when a voltage larger than the rated voltage is applied.

As such a protection device, a so-called fusing resistor is known that is a protection device comprising a thermal fuse and a resistive body wherein the resistive body is supplied with a current in an abnormal state so that the resistive body generates heat, the heat activates the thermal fuse (Patent Document 1).

It is also proposed as another protection device to connect a bimetal switch and a positive temperature coefficient (PTC) component in parallel for use (Patent Document 2). In such a protection device, when overcurrent conditions are established, a bimetal portion of the bimetal switch achieves a high temperature so that the contact points become apart from each other and opened, allowing the current to turn to the PTC component. As a result, the PTC component trips to achieve the high-temperature/high resistance state by the overcurrent, substantially cutting off the current flowing through the PTC component.

PRIOR ART DOCUMENT

Patent Document

Patent Document 1: JP 2009-295567 A
Patent Document 2: International Publication No. 2008/114650

SUMMARY OF THE INVENTION

Problem to be Solved by the Invention

Although a sufficient protection can be achieved in many cases by the protection device as described in Patent Document 1, the rated voltage and the rated current of such a protection device may not necessarily be sufficient in an electric apparatus using a high-voltage or a high-current battery or power supply Although a sufficient protection can be achieved in many cases by the protection device as described in Patent Document 2, it has been found that it may not necessarily be able to fully suppress arc occurring at the time of cutting off depending on the conditions. It has been further noticed that a very small current (leak current) flows also in the case where the PTC component trips and becomes a high-resistance state to substantially cut off the flow of current and that even a very small current may have to be preferably prevented in some cases. Furthermore, if the very small current continues to flow, the PTC component has to continue to work when the time to eliminate the abnormality is elongated, resulting in occurrence of a deficiency.

Thus, a problem to be solved by the present invention is to provide a protection device capable of sufficiently suppressing the occurrence of arc at the time of activation with large rated voltage and rated current, as well as capable of fully opening the circuit.

Means to Solve the Problem

According to a first aspect, there is provided a protection device comprising:

(i) a protection component comprising a first thermal fuse and a resistive body wherein in an abnormal state the resistive body is supplied with a current to generate heat, and by the heat the first thermal fuse activates to cut off the current;

(ii) a PTC component; and (iii) a second thermal fuse, wherein the second thermal fuse is electrically connected to the PTC component in series, the first thermal fuse of the protection component is electrically connected to the PTC component and to the second thermal fuse in parallel, and by activating the protection component in the abnormal state, the PTC component trips to generate heat, and the heat fuses the second thermal fuse.

According to a second aspect, there is provided an electric apparatus comprising the protection device.

Effect of the Invention

Although, if any abnormality occurs in a circuit or an electric apparatus in which the protection device of the present invention is incorporated, the protection device supplies a current to the resistive body of the protection component to thereby activate the first thermal fuse to protect the circuit, the protection device can divert a part of the current flowing through the first thermal fuse to a circuit of the PTC component, thus enabling the occurrence of arc to be suppressed, leading to an improved voltage resistance of the protection device. After the activation of the first thermal fuse, the PTC component trips to have a high temperature, which heat blows the second thermal fuse, enabling the circuit to be fully opened.

EMBODIMENTS TO CARRY OUT THE INVENTION

A protection device of the present invention will be described in detail with reference to the drawings. It is however to be noted that the protection device of the present invention is not limited to embodiments shown.

Figure 1:
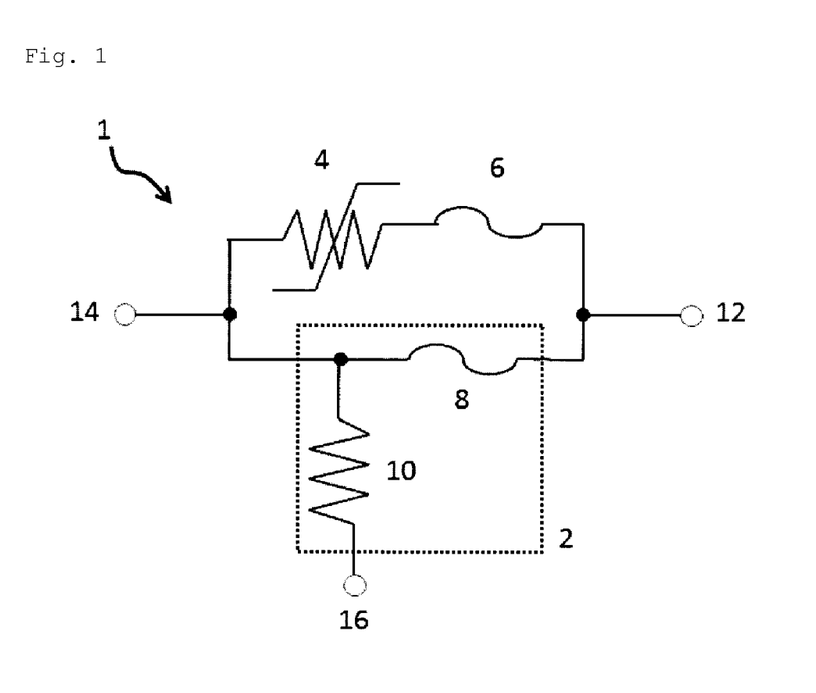
FIG. 1 is a circuit diagram of an embodiment of a protection device of the present invention.

FIG. 1 is a circuit diagram corresponding to an embodiment of the protection device of the present invention. As shown in FIG. 1, a protection device 1 of the present invention comprises a protection component 2, a PTC component 4, and a second thermal fuse 6. In the protection device, the PTC component 4 and the second thermal fuse 6 are electrically connected to each other in series, and the protection component 2 is electrically connected thereto in parallel. The protection component 2 is a portion enclosed by a dotted line in FIG. 1 and comprises a first thermal fuse 8 and a resistive body 10. This protection component 2 activates when the first thermal fuse 8 activates by heat generated in the resistive body 10 as a result of electric current passage therethrough. The protection device 1 further has terminals 12 and 14 for connection to an electric circuit or an electric apparatus to be protected and has a terminal 16 for electric current passage through the resistive body 10.

In the protection device 1 of the present invention, in the normal state, the resistance value of the first thermal fuse is sufficiently smaller than the resistance value of the PTC component 4, so that an electric current flows in the order of the terminal 12, the first thermal fuse 8 and the terminal 14 (or in the opposite order), with substantially no electric current flowing through the PTC component 4 and the second thermal fuse 6.

In the abnormal state, for example, in case a short circuit, overcurrent, overvoltage, abnormal heat, etc. occur in the electric circuit or the electric apparatus, an electric current is supplied from the terminal 16 to the resistive body 10, as a result of which the resistive body 10 generates heat. Due to this heat, the first thermal fuse 8 activates (i.e. the protection component 2 activates), allowing the electric current flowing through the first thermal fuse 8 to turn to the PTC component 4 so that the turned current causes the PTC component 4 to trip (activate). Subsequently, by heat generated in the tripped PTC component 4, the second thermal fuse 6 fuses to completely open the circuit so that the electric circuit or the electric apparatus is protected.

In the protection component used in the protection device of the present invention, the resistive body and the first thermal fuse are arranged such that they are thermally coupled with each other. That is, the first thermal fuse is under the thermal influence of the resistive body and activates by heat generated in the resistive body. The number of first thermal fuses to be disposed is not particularly limited, and a single or a plurality of, e.g. two or three ones may be disposed. The location to dispose the first thermal fuse is not particularly limited as long as it is electrically connected in series with the electric circuit or the electric apparatus to be protected, it is electrically connected in parallel with the PTC component and the second thermal fuse and it is disposed under the thermal influence of the resistive body, and the first thermal fuse may be disposed upstream and/or downstream of the resistive body.

The resistive body used in the protection component is not particularly limited as long as it can be used as a heating body.

The first thermal fuse used in the protection component can be one using a material used as a thermal fuse in general, and for example, can be a low-melting-point metal (including a low-melting-point alloy) such as solder, in addition to a commercially available thermal fuse. Examples of a preferred low-melting-point metal include Sn-3.0 Ag-0.5 Cu and Sn-58 Bi, although not particularly limited thereto. It would be possible for those skilled in the art to select a proper thermal fuse as the first thermal fuse so as to allow exertion of a desired function, based on the contents of this specification.

The first thermal fuse may activate by a general fusion cutting, that is, by severing of a fuse element as a result of being drawn to electrodes at both ends of the element due to a surface tension occurring when the fuse element melts, or may activate by physically separating the electrodes connected to the fuse element to ensure an insulation distance, by use of a mechanical auxiliary mechanism, e.g. a spring or a magnet.

In a preferred embodiment, the protection component has a mechanism mechanically aiding the activation of the first thermal fuse. In this embodiment, one of the electrodes of the first thermal fuse may be a movable electrode and the other may be a fixed electrode, or both of the electrodes may be movable electrodes. By using such a mechanical auxiliary mechanism, the insulation distance can instantaneously be ensured, enabling the occurrence of arc to be more suppressed.

Examples of the protection component include a fusing resistor. The fusing resistor refers to a thermal fuse with resistive body having a resistive body and a low-melting-point metal (functioning as a thermal fuse) that melts by heat generated as a result of current passage through the resistive body.

Preferably, a fusing resistor is used that has a pair of lead fixed electrodes, a guide shaft is juxtaposed to the lead fixed electrodes, wherein a movable electrode is disposed such that it bridges the lead fixed electrodes while being inserted into the guide shaft, a tip of each of the lead fixed electrodes and the movable electrode are joined with a low-melting-point alloy, and the guide shaft and the movable electrode is joined with a low-melting-point alloy, a compression spring is provided which applies a force to the movable electrode in a direction away from the lead fixed electrodes, and when the low-melting-point alloy is melted, the compression spring presses the movable electrode so that the movable electrode separates from the lead fixed electrodes.

More preferably, the fusing resistor is used that is characterized in that one lead conductor of a resistor having lead conductors fitted to both ends of the resistive body is used as the guide shaft, a coil spring is used as the compression spring, the coil spring is inserted in the one lead conductor between the resistive body and the movable electrode, and a circuit applying a current to a resistor for generating a heat is connected between the one lead conductor of the resistor and either one of the two lead fixed electrodes.

The fusing resistor is described in e.g. Japanese Patent Nos. 4630403, 4757931, 4630404, 4757895, 4757898, 4943359, and 4943360. These documents are incorporated herein in their entireties by reference.

The PTC component used in the protection device of the present invention is not particularly limited and can be a conventionally used PTC component, e.g. a polymer PTC component or a ceramic PTC component. A preferred PTC component is the polymer PTC component. The number of the PTC components to be disposed is not particularly limited, and a single or a plurality of, e.g. two or three ones may be disposed. The location to dispose the PTC component is not particularly limited as long as it is electrically connected in series to the electric circuit or the electric apparatus to be protected and to the second thermal fuse and it is electrically connected in parallel to the first thermal fuse.

The polymer PTC component has a laminate PTC element and electrodes (e.g. metal foil) arranged on both sides of the laminate PTC element, the laminate PTC element being obtained by extruding an electrically conductive composition containing a polymer (e.g. polyethylene, polyvinylidene fluoride, etc.) in which an electrically conductive filler (e.g. carbon black, nickel alloy, etc.) is dispersed. Other elements such as leads may directly be connected to the PTC element, without disposing the electrodes.

In the preferred embodiment, the PTC component has a resistance value equal to or less than a rated voltage of the protection component/abnormal current, at a use temperature. That is, in this embodiment, when the first thermal fuse activates, an electric current flowing through the first thermal fuse turns to the PTC component so that the protection component is not subjected to a voltage higher than its rated voltage.

The voltage applied to the protection component (specifically, the first thermal fuse) is a voltage (voltage between the terminals 12 and 14 in FIG. 1) applied to the protection device. Therefore, the both-end voltage of the protection device should be equal to or less than the rated voltage of the protection component when the first thermal fuse 5 activates. That is, $$E_d \leq E_r \quad (1)$$

wherein:
$E_d$=both-end voltage of protection device when first thermal fuse activates (is abnormal), and
$E_r$=rated voltage of protection component should be satisfied.

The both-end voltage of the protection device is expressed as $$E_d = I_c \times R_d \quad (2)$$

wherein
$E_d$=both-end voltage of protection device,
$I_c$=circuit current, and
$R_d$=resistance of entire protection device.

Since $R_d$ is a combined resistance of the protection component (first thermal fuse), the PTC component, and the second thermal fuse, $R_d$ is expressed as $$R_d = 1/(1/R_1 + 1/(R_p + R_2))$$

wherein
$R_1$=resistance of protection component (first thermal fuse),
$R_p$=resistance of PTC component, and
$R_2$=resistance of second thermal fuse.

Since $R_p$ is sufficiently larger than $R_2$, $R_2$ can be ignored, so that $R_d$ is expressed as $$R_d = 1/(1/R_1 + 1/R_p) \quad (3)$$

Furthermore, when the first thermal fuse activates as a result of occurrence of an abnormality, the resistance value of the first thermal fuse can be regarded as infinity so that $1/R_1$ can be ignored. That is, the resistance ($E_{d'}$) of the entire protection device upon the activation of the first thermal fuse is expressed as $$R_{d'} = 1/(1/R_p) = R_p \quad (3')$$

From expressions (1), (2), and (3'), let $I_{c'}$ be a circuit current at the time of abnormality (in this specification, referred to also as abnormal current), e.g. a short-circuit current when the abnormality is a short circuit, $$I_C R_p \leq E_r$$

is established, which is transformed as $$R_p \leq E_r / I_{C'}$$

wherein
$R_p$=resistance of PTC component,
$E_r$=rated voltage of protection component, and
$I_{C'}$=abnormal current.

Therefore, by setting the resistance value of the PTC component to be equal to or less than the rated voltage/abnormal current, the voltage applied to the protection component at the time of activation can be not more than the rated voltage. That is, by setting the resistance value of the PTC component to be as small as possible, the current acceptable in the abnormal state becomes large.

The use temperature is a temperature of an environment in which the protection device of the present invention is used in the normal state, and is determined depending on the use, the location of disposition, etc. of the protection device. The use temperature is typically a room temperature (about 20 to 25° C.) but is not limited thereto, and for example, it may be a higher temperature, more specifically, about 25 to 100° C., and for example, may be in the range of about 30 to 60° C. The abnormal current means the value of an electric current flowing through the protection device when an abnormality occurs, for example, at the time of a short circuit.

In another preferred embodiment, the polymer PTC component has a resistance value not more than the protection component rated voltage/abnormal current at a temperature lower 10° C., preferably 5° C. than a softening point of a polymer material of the polymer PTC component.

The softening point of the polymer material of the polymer PTC component can be obtained by measuring in accordance with JIS K7206 for example. When the temperature of the polymer PTC component reaches a temperature higher than the softening point, the rate of increase in the resistance value of the PTC component becomes drastically large, and for example, the slope of a tangent of a resistance value-temperature curve becomes five times or more the slope at 25° C.

In general, the softening point of the polymer material of the polymer PTC component is set to be tens of degrees centigrade higher than the use temperature. Thus, if the polymer PTC component has a resistance value equal to or less than the protection component rated voltage/abnormal current at a temperature slightly lower than the softening point, e.g. at a temperature lower by 10° C., preferably, at a temperature lower by 5° C., the occurrence of arc can be suppressed when the first thermal fuse activates, even though the ambient temperature of the PTC component reaches and exceeds the assumed use temperature for some reason.

In yet another embodiment, the PTC component has an activating time longer than an insulation time of the first thermal fuse.

In this specification, the activating time of the PTC component means a time from the passage through the PTC component of current diverted by activation of the protection component up to arriving of the both-end (electrode) voltage of the PTC component at the rated voltage of the protection component.

In this specification, the insulation time of the first thermal fuse means a time from the activation of the first thermal fuse up to achieving its insulation. For example, in the case that the activation of the first thermal fuse arises from a general fusion cutting, it means a time from the start of fusion cutting of the fuse element, i.e. from a point of time at which the fuse element melts and thins to allow its resistance value to start to increase, up to solidification of the fuse element after the fusion cutting. In the case that the first thermal fuse activates by a mechanical auxiliary mechanism, it means a time from start of melting of a fuse element (low-melting-point metal) connecting opposite electrodes of the first thermal fuse to allow the two electrodes to be separated from each other, up to securely achieving the insulation distance therebetween.

In the case that the activation of the first thermal fuse is triggered by a general fusion cutting, the activating time of the PTC component is preferably 30 milliseconds or more, and more preferably, 40 milliseconds or more.

In the case that the activation of the first thermal fuse is mechanically aided, the activating time of the PTC component is preferably 3 milliseconds or more, and more preferably, 5 milliseconds or more.

The first thermal fuse safely cuts off the current by allowing: the fuse element to melt due to Joule heat generated in the resistive body; the molten fuse element to be fusion cut or severed by a mechanical auxiliary mechanism; and the distance between the severed fuse elements (electrodes) to be the insulation distance or more. Although arc may occur in the state where the distance between the fusion-cut or severed elements (electrodes) is less than the insulation distance, the arc disappears if the distance becomes equal to or more than the insulation distance. However, in the case that the first thermal fuse activates by a general fusion cutting, the elements immediately after the fusion cutting have not completely solidified and have a fluidity, with the result that they deform so that the distance between the severed elements may become less than the insulation distance. In the case that the first thermal fuse is severed by a mechanical auxiliary mechanism, e.g. by a spring, the movable electrode oscillates for a certain period of time after the severing, with the result that the distance from the other electrode becomes uncertain and that the distance may become less than the insulation distance. At this time, if the voltage applied to the protection component exceeds the rated voltage of the protection component, arc abruptly occurs, resulting in a serious deficiency such as damaging the equipment to be protected. As described above, by setting the activating time of the PTC component to be longer than the insulation time of the element of the first thermal fuse, the above problem can be avoided, enabling the current to be cut off more safely.

The second thermal fuse used in the PTC device of the present invention is not particularly limited, and can be not only a commercially available thermal fuse but also one used as a thermal fuse in general. The number of second thermal fuses to be disposed is not particularly limited, and a single or a plurality of, e.g. two or three ones may be disposed. The location to dispose the second thermal fuse is not particularly limited as long as it is under the thermal influence of the PTC component and it is electrically connected in series to the electric circuit or the electric apparatus to be protected and to the PTC component.

In a preferred embodiment, the second thermal fuse has an activation temperature lower than the trip temperature of the PTC component. By allowing the second thermal fuse to have such an activation temperature, the second thermal fuse can securely be fusion-cut after the tripping of the PTC component, enabling the circuit to be completely opened more reliably.

The trip temperature of the PTC component means a temperature at which the PTC component trips (activates) resulting in a high-temperature and high-resistance state, specifically, a temperature when the resistance value of the PTC component becomes $10^3$ times or more that in the normal state.

In a more preferred embodiment, the second thermal fuse has a fusing time at an abnormal current longer than a tripping time of the PTC component. Since the second thermal fuse has such a fusion cutting time, the fusion cutting of the second thermal fuse can be made after the tripping of the PTC component, i.e. after the substantial suppression of current, enabling the occurrence of arc caused by the fusion cutting of the second thermal fuse to be suppressed.

The tripping time of the PTC component means a time from the passage through the PTC component of current turned as a result of the activation of the protection component, up to resulting in the high-temperature and high-resistance state by the tripping of the PTC component, specifically, up to the time at which the resistance value of the PTC component becomes $10^3$ or more times that in the normal state.

The fusing time of the second thermal fuse means a time from the passage through the second thermal fuse of current turned as a result of the activation of the protection component, up to the time at which the second thermal fuse will blow if this current continues to flow.

In a preferred embodiment, the second thermal fuse has a withstand voltage equal to or more than the abnormal voltage in a leak current when the PTC component is in the tipping state. The PTC component can flow a leak current (very small current), e.g. a current of about 30 mA after tripping. Since the second thermal fuse has a withstand voltage equal to or more than the abnormal voltage (voltage applied to the circuit in the abnormal state, e.g. at the time of short circuit) in such a leak current, it is possible to suppress the occurrence of arc caused by the blowing of the second thermal fuse.

Naturally, the PTC component and the second thermal fuse need to activate subsequent to the first thermal fuse and do not lie under the thermal influence of the resistive body.

When the first thermal fuse of the protection component activates, the protection device of the present invention can turn a part of current flowing through the first thermal fuse to the circuit of the PTC component and can suppress the occurrence of arc at the time of activation, so that, even if used in the electric circuit or the electric apparatus to which a voltage exceeding the rated voltage of the protection component is applied and/or through which a current exceeding the rated current flow, it can safely cut off the current.

Although the protection device of the present invention has been described hereinabove, the present invention can variously be modified.

Figure 2:
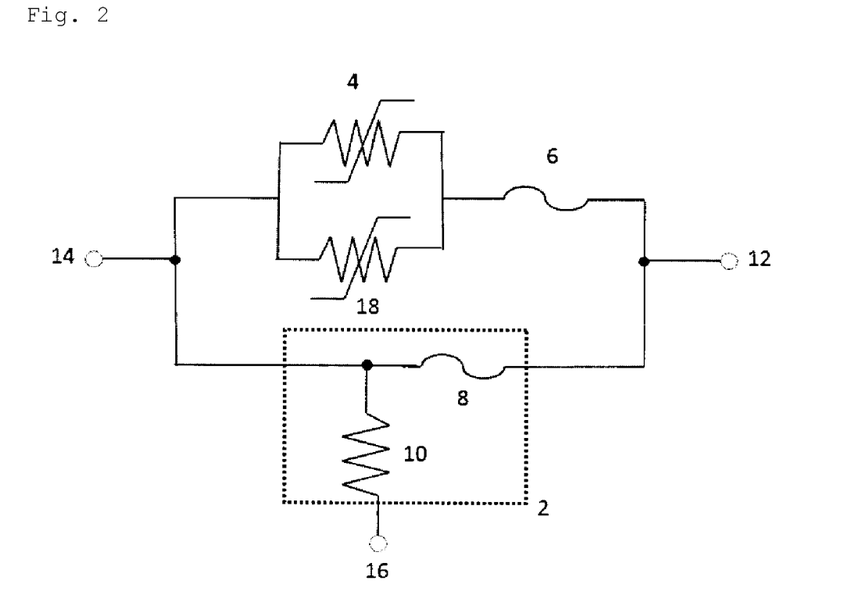
FIG. 2 is a circuit diagram of another embodiment of the protection device of the present invention.

FIG. 2 is a circuit diagram of another embodiment of the protection device of the present invention.

In this embodiment, the protection device of the present invention comprises another PTC component 18. That is, the protection device of the present invention in this embodiment comprises two PTC components. These PTC components are electrically connected in parallel to each other and are electrically connected in series to the second thermal fuse. The other configurations are substantially the same as those in the embodiment shown in FIG. 1.

Although two PTC components are used in FIG. 2, more than two PTC components may be used. These PTC components are electrically connected in parallel to one another and are electrically connected in series to the second thermal fuse.

In the case of using such a plurality of PTC components, the above "resistance value of the PTC component" is a combined resistance value of the plurality of PTC components. Therefore, by using a plurality of PTC components in parallel in this manner, the "resistance value of the PTC component" can be reduced so that the resistance value of the PTC component can easily be not more than the protection component rated voltage/abnormal current.

Figure 3:
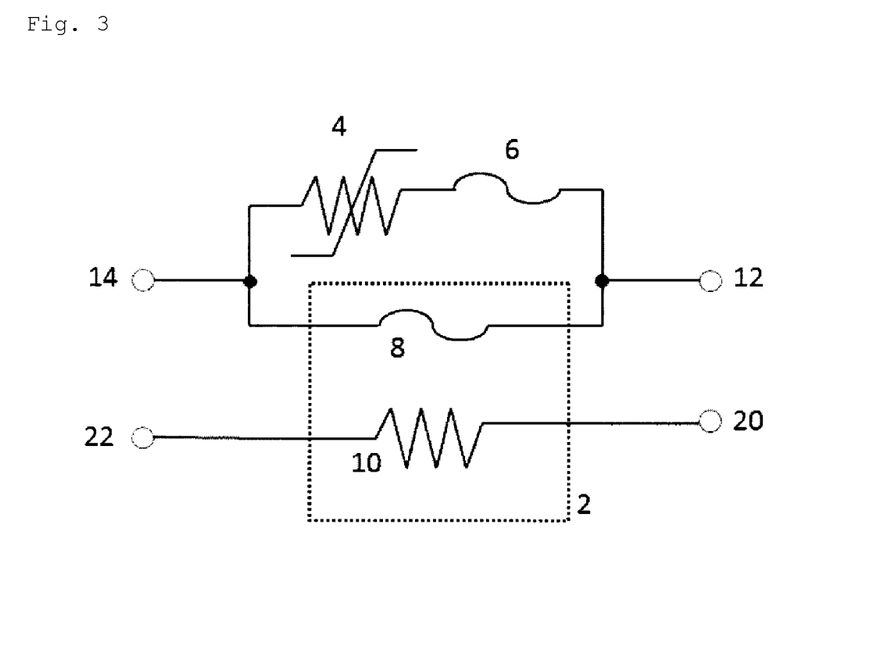
FIG. 3 is a circuit diagram of yet another embodiment of the protection device of the present invention.

FIG. 3 is a circuit diagram of yet another embodiment of the protection device of the present invention.

Although in the embodiment shown in FIG. 1 the resistive body is incorporated in the same circuit as the first thermal fuse lies, FIG. 3 differs therefrom in that the resistive body is incorporated in a separate circuit. Accordingly, in this embodiment, the protection device of the present invention has four terminals, i.e. the terminals 12 and 14, and terminals 20 and 22. The other configurations are substantially the same as those in the embodiment shown in FIG. 1.

In a second aspect, the present invention also provides an electric apparatus having the protection device of the present invention.

EMBODIMENT (Embodiment)

Fabrication of Protective Device

Figure 4:
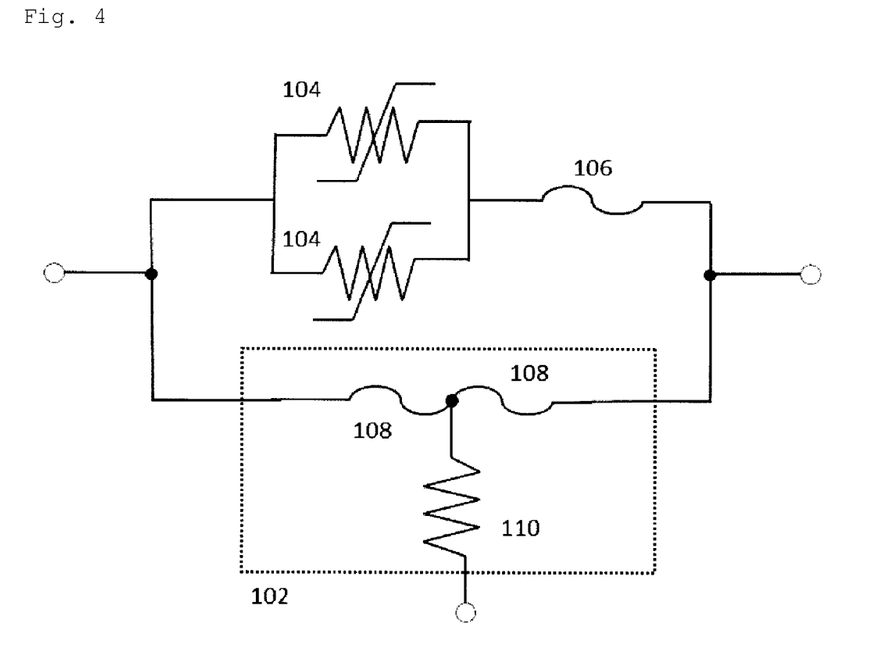
FIG. 4 is a circuit diagram of the protection device of the present invention in an embodiment.

A fusing resistor (model number: BZ05, rated current: 75 A, rated voltage: 60 V) manufactured by Uchihashi Estec Co., Ltd. was used as the protection component 102; two Poly Switches (registered trademark) (model number: TRF600-400, resistance value: 1.2Ω, softening point: 80° C.) manufactured by TE Connectivity Ltd. were used as the PTC component 104; and a thermoprotector (model number: TR92, nominal activating temperature: 115° C., rated current: 9 A, rated voltage: 32 V) manufactured by Uchihashi Estec Co., Ltd. was used as the second thermal fuse 106, which were connected so as to make up the circuit diagram shown in FIG. 4, to fabricate the protection device of the present invention. A portion enclosed by a dotted line in FIG. 4 is a fusing resistor which comprises a resistive body 110 and a thermal fuse 108.

Cut-Off Test

Figure 5:
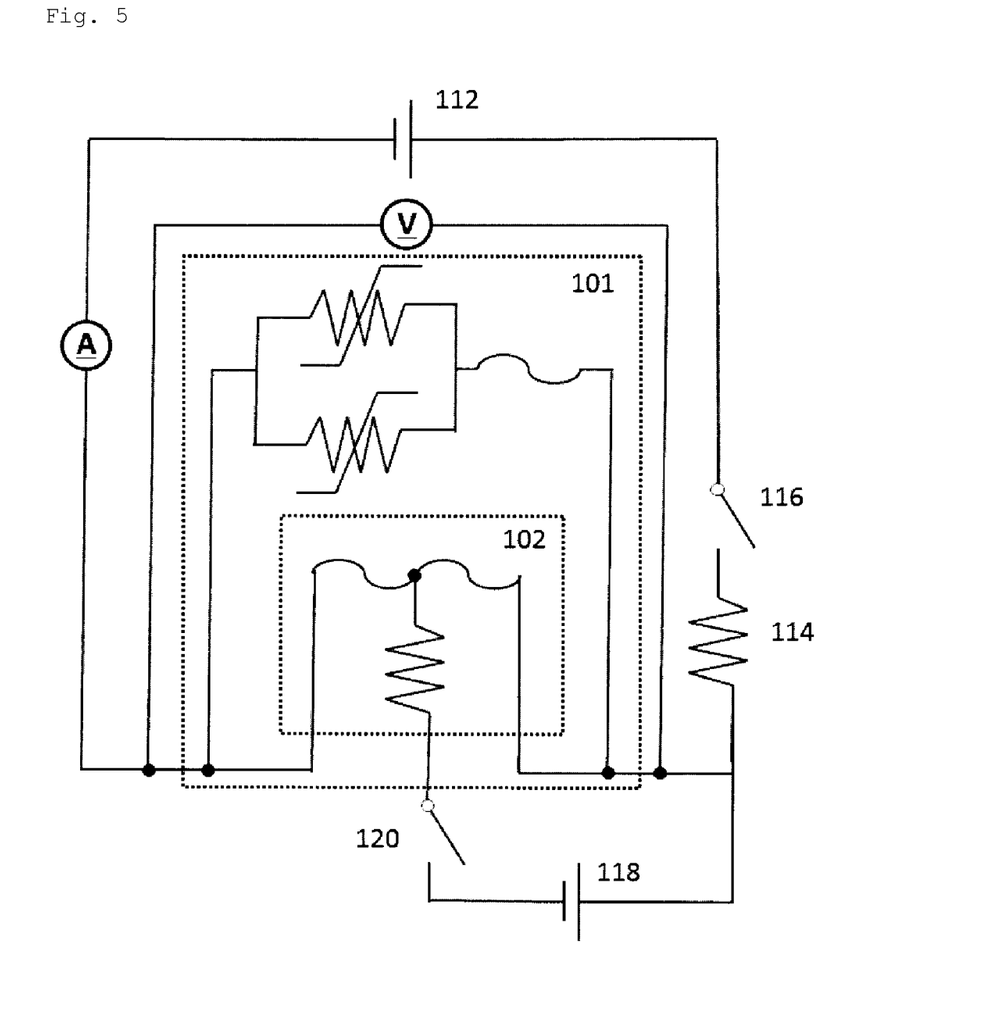
FIG. 5 is circuit diagram of a test circuit of a fusing test.
Figure 6:
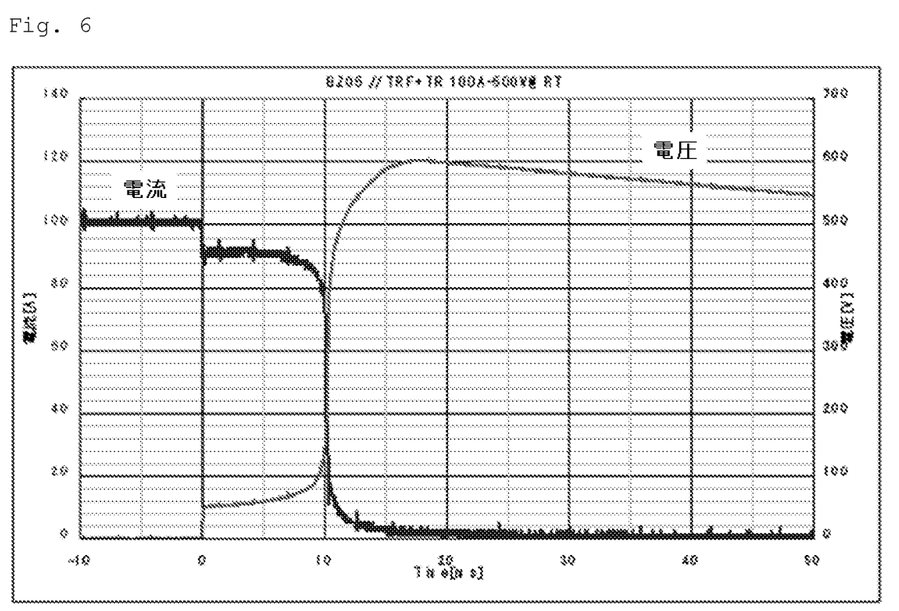
FIG. 6 is a graph showing both-end voltages of the protection device in the fusing test and circuit currents.

A cut-off test was carried out in a circuit shown in FIG. 5 using a protection device 101 fabricated. Devices used are shown in Table 1 below. A portion enclosed by an inner broken line is the fusing resistor, and a portion enclosed by an outer broken line is the protection device. At a room temperature, a 100 A-500 V current was supplied into the circuit from a power line DC power supply 112, while a current was supplied to a resistive body of the fusing resistor from a signal line DC power supply 118, to activate the thermal fuse of the fusing resistor. The both-end voltage of the protection device and the circuit current were measured. The results are shown in FIG. 6 (the time at which the thermal fuse of the fusing resistor activates is 0 sec).

TABLE 1

| EQUIPMENT CATEGORY | DEVICE NAME |
| --- | --- |
| POWER LINE DC POWER SUPPLY | THYRISTOR RECTIFIER YS-3500-120SRS (manufactured by YAMABISHI Electric Co., Ltd.) |
| POWER LINE LOAD DEVICE | LOAD RESISTOR RX-250-37.5 kW (manufactured by YAMABISHI Electric Co., Ltd.) |
| SIGNAL LINE DC POWER SUPPLY | DC POWER SUPPLY GP0110-10 (manufactured by TAKASAGO Mfg. Co., Ltd.) |
| VOLTMETER | MEMORY HIGH CODER 8808 (manufactured by HIOKI E.E. Corporation) |
| AMMETER | FLOW DIVIDER 200 A-200 mV (manufactured by TSURUGA Electric Works, Ltd.) |

TABLE 1-continued

| EQUIPMENT CATEGORY | DEVICE NAME |
| --- | --- |
| | MEMORY HIGH CODER 8808 (manufactured by HIOKI E.E. Corporation) |
| | CLAMP-ON PROBE 3274 (manufactured by HIOKI E.E. Corporation) |

Results

Regardless of the current and voltage significantly exceeding the rated current (75 A) and the rated voltage (60 V) of the fusing resistor, the protection device successfully cut off the current without any troubles. Although not shown in FIG. 6, the second thermal fuse was also successfully blown out after about four seconds without any troubles and the circuit was fully opened.

Although from FIG. 6, a rise in voltage of about 10 V was seen immediately after the activation of the thermal fuse of the fusing resistor, it was found that the rise in voltage was suppressed till after about 10 milliseconds thereafter. This is because the current flowing through the fusing resistor was turned to the PTC component. Although the current at the time of the activation is about 90 A and exceeds the rated current of the fusing resistor, the voltage at the activation is 10 V or less and is far below the rated voltage, and hence the current can be cut off without any troubles.

EXPLANATION OF THE REFERENCE NUMERALS

1—protection device;
2—protection component;
4—PTC component;
6—second thermal fuse;
8—first thermal fuse;
10—resistive body;
12—terminal;
14—terminal;
16—terminal;
18—PTC component;
20—terminal;
22—terminal;
101—protection device;
102—protection component;
104—PTC component;
106—second thermal fuse;
108—first thermal fuse;
110—resistive body;
112—power line DC power supply;
114—power line load;
116—switch;
118—signal line DC power supply;
120—switch

The invention claimed is:

1. A protection device comprising:
(i) a protection component comprising a first thermal fuse and a resistive body wherein in an abnormal state the resistive body is supplied with a current to generate heat, and by the heat the first thermal fuse activates to cut off the current;
(ii) a PTC component; and
(iii) a second thermal fuse,
wherein the second thermal fuse is electrically connected to the PTC component in series,
the first thermal fuse of the protection component is electrically connected to the PTC component and to the second thermal fuse in parallel, and by activating the protection component in the abnormal state, the PTC component trips to generate heat, and the heat fuses the second thermal fuse;
wherein an activating time of the PTC component is longer than an insulation time of a fuse element of the first thermal fuse.

2. The protection device according to claim 1, wherein the protection component is a fusing resistor.

3. The protection device according to claim 2, wherein the fusing resistor has a pair of lead fixed electrodes, a guide shaft is juxtaposed to the lead fixed electrodes, wherein
a movable electrode is disposed such that it bridges the lead fixed electrodes while being inserted into the guide shaft,
a tip of each of the lead fixed electrodes and the movable electrode are joined with a low-melting-point alloy, and the guide shaft and the movable electrode is joined with a low-melting-point alloy,
a compression spring is provided which applies a force to the movable electrode in a direction away from the lead fixed electrodes, and
when the low-melting-point alloy is melted, the compression spring presses the movable electrode so that the movable electrode separates from the lead fixed electrodes.

4. The protection device according to claim 3, wherein
in the fusing resistor, one lead conductor of a resistor having lead conductors fitted to both ends of the resistive body is used as the guide shaft,
a coil spring is used as the compression spring,
the coil spring is inserted in the one lead conductor between the resistive body and the movable electrode, and
a circuit applying a current to a resistor for generating a heat is connected between the one lead conductor of the resistor and either one of the two lead fixed electrodes.

5. The protection device according to claim 1, wherein the PTC component is a polymer PTC component.

6. The protection device according to claim 1, wherein a resistance value of the PTC component at a use temperature is equal to or less than a rated voltage of the protection component/abnormal current.

7. The protection device according to claim 5, wherein a resistance value of the PTC component at a temperature lower 10° C. than a softening point of a polymer material of the polymer PTC component is equal to or less than a rated voltage of the protection component/abnormal current.

8. The protection device according to claim 1, wherein an activating time of the PTC component is 3 milliseconds or more.

9. The protection device according to claim 1, further comprising one or more PTC components electrically connected to the PTC component in parallel and electrically connected to the second thermal fuse in series.

10. The protection device according to claim 1, wherein an activation temperature of the second thermal fuse is lower than a trip temperature of the PTC component.

11. The protection device according to claim 1, wherein a fusing time of the second thermal fuse at an abnormal current is longer than a tripping time of the PTC component.

12. The protection device according to claim 1, wherein the second thermal fuse has a withstand voltage equal to or more than an abnormal voltage at a leak current when the PTC component is in its tripping state.

* * * * *